No. 734,730. PATENTED JULY 28, 1903.
S. B. MILLARD.
OPTICIAN'S MEASURE.
APPLICATION FILED JUNE 9, 1902.
NO MODEL.
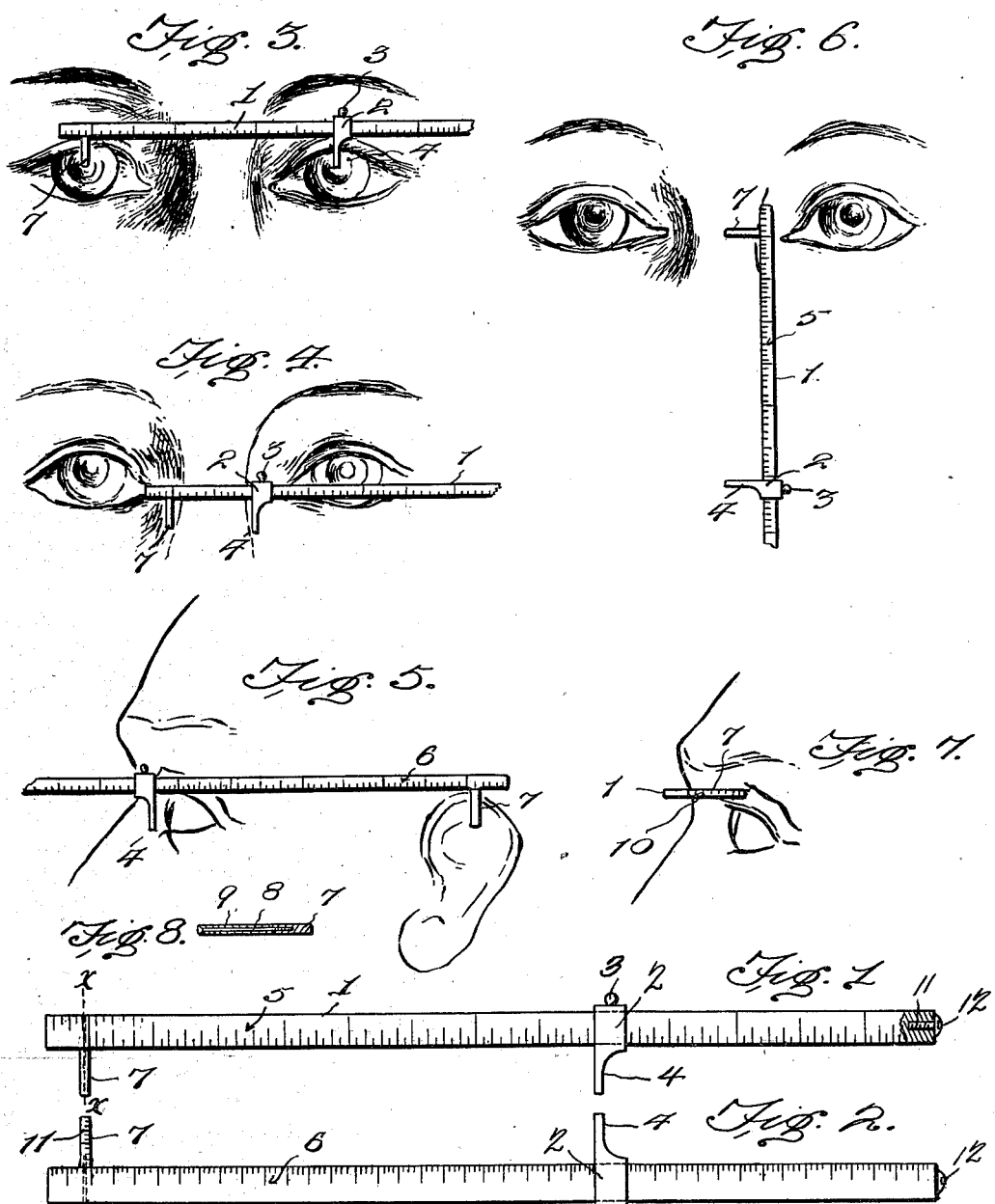

No. 734,730.

Patented July 28, 1903.

UNITED STATES PATENT OFFICE.

SAMUEL B. MILLARD, OF LITCHFIELD, MINNESOTA.

OPTICIAN'S MEASURE.

SPECIFICATION forming part of Letters Patent No. 734,730, dated July 28, 1903.

Application filed June 9, 1902. Serial No. 110,941. (No model.)

*To all whom it may concern:*

Be it known that I, SAMUEL B. MILLARD, a citizen of the United States, residing at Litchfield, in the county of Meeker and State of Minnesota, have invented a new and useful Optician's Measure, of which the following is a specification.

This invention relates to a measuring device or gage which is constructed especially for the use of opticians for the purpose of taking the various measurements of the faces of persons to whose eyes spectacles or eyeglasses are to be fitted in order that the bows and other parts of such spectacles or glasses may be so constructed as to insure an exact fit in each individual case. To accomplish this purpose, I provide a graduated gage of special construction whereby it shall be adapted to be used for the purpose of taking all the requisite measurements. The detailed construction of the said measuring instrument or gage and the method of using the same will be hereinafter fully described, and particularly pointed out in the claims.

In the drawings hereto annexed, Figure 1 is a plan view of my improved gage or measuring instrument. Fig. 2 is a plan view showing the same reversed so as to expose the opposite side thereof. Fig. 3 is a front view showing my improved measuring instrument applied for the purpose of measuring the distance between the pupils of the eyes. Fig. 4 is a similar view showing the instrument applied to measure the width of the bridge of the nose at the base thereof. Fig. 5 is a view showing the instrument applied to measure the length of the temple from the back of the ear to the eyelashes. Fig. 6 is a view showing the instrument applied to measure the height of the nose above the corner of the eye. Fig. 7 shows the instrument applied to measure the depth or distance between the bridge of the nose and the eyelashes. Fig. 8 is a sectional detail view of the instrument taken on the line $x\,x$ in Fig. 1.

Corresponding parts in all the figures are designated by like characters of reference.

My improved measuring instrument or gage is composed of a light bar or strip of metal 1, upon which is mounted a slide 2, provided with a knob or handle 3, whereby it may be conveniently adjusted to any desired position upon the said bar, and with a pin 4 extending from the opposite side thereof. The said slide is to be made very light, so as to offer no obstruction when the device is used for the purpose of taking the various measurements. When I say that it is to be "light," I thereby mean that the metallic shell of which it is constructed shall be made quite thin, so thin that the thickness thereof shall not be sufficient to effect the correctness of any measurement taken when the said slide rests against the face of the person whose measurements are being taken, as is the case, for instance, in Fig. 3 of the drawings. The slide 2 may be retained in position upon the bar 1 by friction, no fastening device of any kind being found necessary.

The bar or strip 1, which constitutes the rule or gage, is provided on opposite sides thereof with measuring-scales, shown, respectively, in Figs. 1 and 2 of the drawings, and designated, respectively, by 5 and 6, one of said scales being laid out in inches and fractions thereof and the other laid off according to the metrical system.

7 designates a pin which extends from the edge of the bar 1, near one end thereof, and which constitutes a stop whereby the instrument may be adjusted against the face of the person to be measured in the desired position. This pin 7 is preferably disposed at a distance from the extreme end of the bar 1 in order that the latter may be grasped and steadied by the fingers of the operator, which, if said pin were located at the extreme end, could not well be done without causing inconvenience to the person whose measurement is being taken. This stop is by preference mounted pivotally upon the bar 1 by means of a pin or bolt 8 extending through a perforation 9 in the latter. This is for the purpose of enabling the pin 7, which is provided on opposite sides thereof with measuring-scales 10 11, laid off to correspond to those upon the sides of the bar 1, to be turned so as to expose toward the end of the said bar the scale which it shall be desired to use.

The method of using my improved measuring instrument will be readily understood when reference is had to the various figures of the drawings. When the pupilary distance is to be measured, the instrument is adjusted, as shown in Fig. 3, across the bridge of the nose, with the pin 7 in exact registration with the pupil of one eye. By moving the slide 2 until the pin 4 thereof is in registration with the pupil of the other eye the exact pupilary distance is obtained. To measure the width of the bridge of the nose, the pin 7 is held in contact with one side thereof and the slide 2 is moved until the pin 4 is in contact with the other side. The distance between the back of the ear and the eyelashes or the length of the temple is obtained by hooking the pin 7 behind the ear and moving the slide 2 until the pin 4 reaches the proper point. The height of the nose above the corner of the eye may be obtained by holding the instrument vertically, as shown in Fig. 6, with the pin 7 resting upon the bridge of the nose. When it is desired to obtain the depth or distance between the bridge of the nose and the eyelashes, the pin 7 is first turned so as to expose toward the end of the bar 1 the scale which it is desired to use, and the instrument is then held against the bridge of the nose with the pin 7 extending above the eyelid, when the desired reading may be conveniently obtained.

By mounting the pin 7 pivotally, as has been herein described, it is obvious that either one of the scales thereon may be exposed toward the end of the instrument for the convenient reading of the same.

By my invention I provide a very simple, inexpensive, and convenient device for taking the various measurements for the use of opticians. These measurements are frequently taken in a haphazard way, and there has been no real certainty as to the fit of the spectacles or glasses constructed according to such measurements. By my invention the various measurements may be taken with absolute accuracy, and an absolute certainty as to the fit of glasses constructed in accordance therewith is insured.

As will be seen by reference to the drawings, the pin 7 extends at right angles to the body of the bar 1, while the pin 4 of the slide 2 corresponds with and is located in a plane parallel to that of the pin 7. This is obviously the most convenient and desirable arrangement of these parts. It will be further noticed that the scales on the opposite sides of the bar 1 and pin 7 read from the inner intersecting corners of said bar and pin. This, too, is necessary in order to enable my improved instrument to be successfully used for the purposes indicated. I desire, further, to invite attention to the fact that the knob or finger-piece 3 is an almost indispensable adjunct to the slide 2, inasmuch as by means of the said knob the said slide may be conveniently manipulated by the index-finger of the person using the instrument. It has already been stated that the said slide is necessarily of a very light construction, and while it would be possible to adjust it without the knob 3 the presence of the said knob very much facilitates the adjustment. I make these statements because I am well aware that measuring instruments have been devised for various purposes in which a slide having a projecting portion has been mounted upon a graduated bar. Such an arrangement is indeed common in measuring instruments used in the various arts. My invention, however, contemplates a specifically-devised instrument for a specific purpose, which has been attained in the manner herein shown and described.

The end of the bar or strip 1 opposite to the end having the pin 7 is provided with a longitudinal socket 11 to receive a set-screw 12, the head of which projects beyond the sides of the strip or bar 1, thereby forming a stop by means of which the slide 2 is prevented from being accidentally locked or detached from said strip or bar.

Having thus described my invention, I claim and desire to secure by Letters Patent of the United States—

1. A measuring instrument for opticians' use comprising a bar having a pin extending at right angles thereto and located at a distance from one end thereof, measuring-scales laid off upon said bar and pin on opposite sides thereof and reading from the inner intersecting corners thereof, and a slide freely movable upon said bar and having a pin corresponding to the pin projecting from said bar.

2. A measuring instrument for opticians' use, comprising a bar having a pin pivotally connected with said bar and extending at right angles thereto, measuring-scales laid off upon said bar and pin on opposite sides thereof and reading from the inner intersecting corners thereof, and a slide freely movable upon said bar and having a pin corresponding to the pin projecting from the bar.

In testimony that I claim the foregoing as my own I have hereto affixed my signature in the presence of two witnesses.

SAMUEL B. MILLARD.

Witnesses:
P. RODOUGE,
L. O. HAMMER.